Oct. 17, 1967  S. ZEMAN  3,347,039
TEMPERATURE COMPENSATING IGNITER
Filed May 7, 1964
2 Sheets-Sheet 1
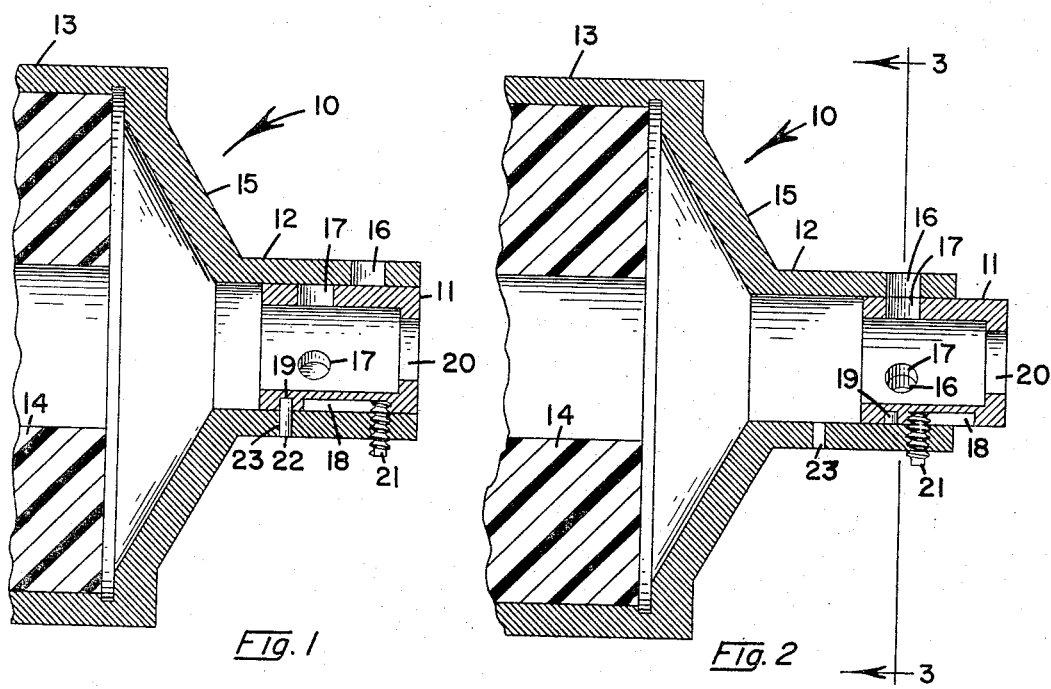
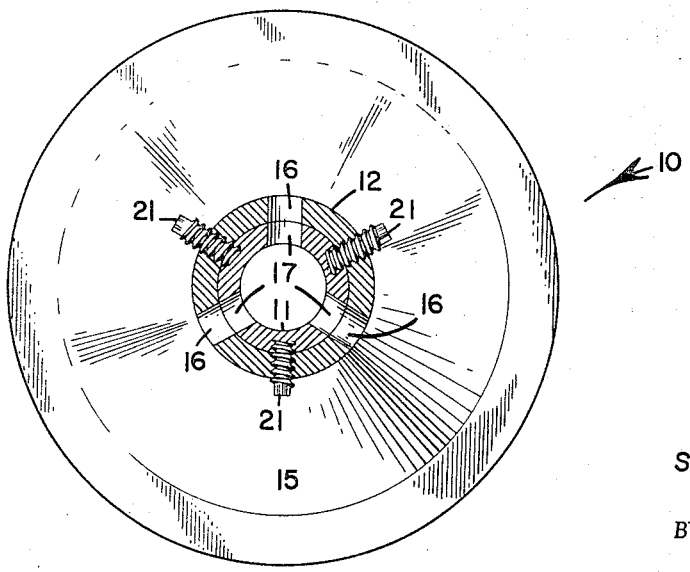
Samuel Zeman INVENTOR
BY
ATTORNEY

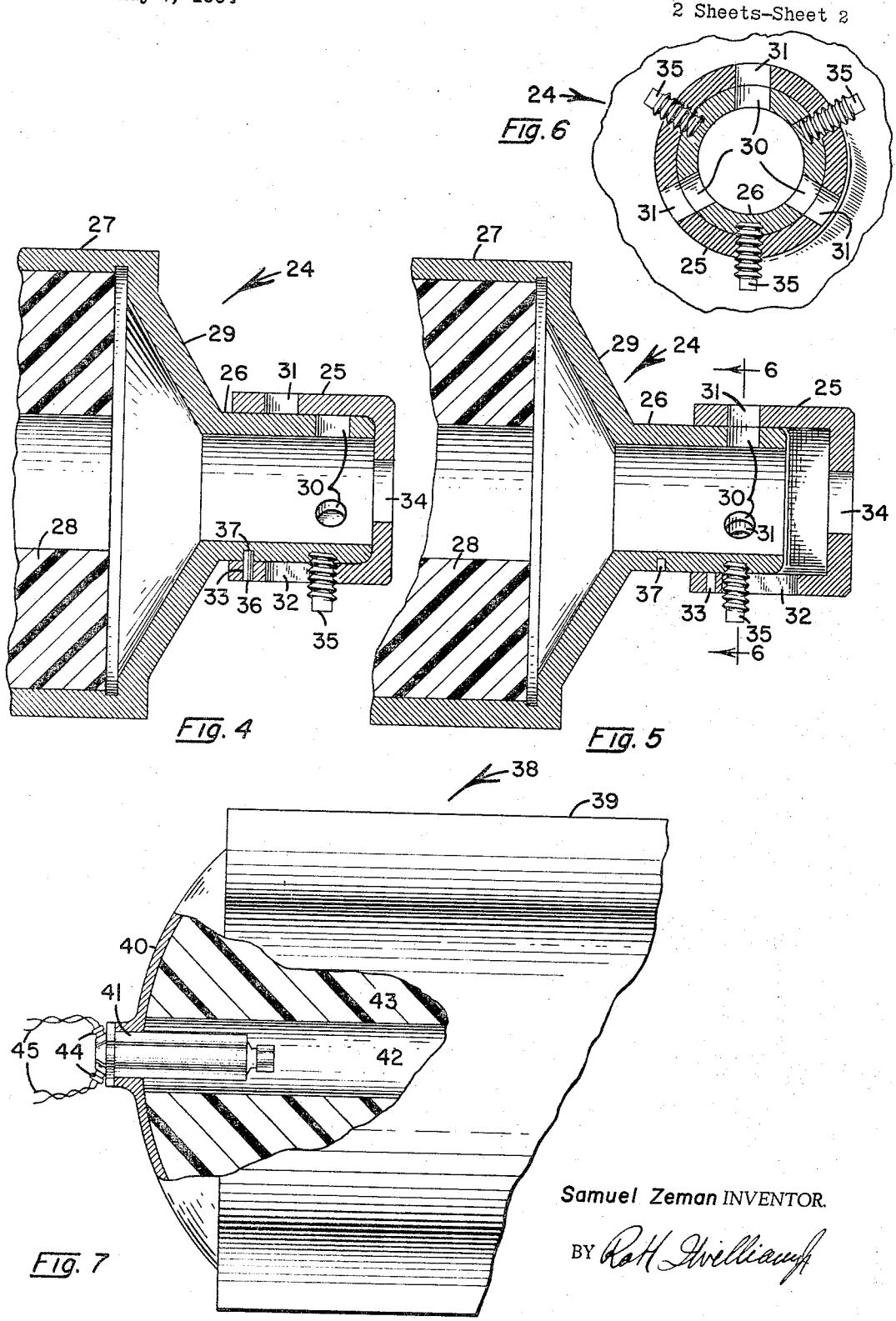

United States Patent Office 3,347,039
Patented Oct. 17, 1967

3,347,039
TEMPERATURE COMPENSATING IGNITER
Samuel Zeman, Huntsville, Ala., assignor to Thiokol Chemical Corporation, Bristol, Pa., a corporation of Delaware
Filed May 7, 1964, Ser. No. 365,671
5 Claims. (Cl. 60—39.82)

This invention relates to temperature compensating igniters for solid propellant rocket motors and, more particularly, to igniters that have incorporated therein means for controlling the energy output of the igniter so that more uniform ignition characteristics are obtained between the high and low extremes of temperature encountered in the solid propellant rocket motor.

Since it is impractical to provide more than one igniter for a solid propellant rocket motor, it was necessary to provide one igniter that could efficiently function and maintain reliability at both low and high temperature.

It is an object of this invention, therefore, to provide a temperature compensating igniter having means incorporated therein that will control the energy output thereof so that the igniter will maintain constant ignition capabilities under extreme temperature conditions.

The largest single factor causing variation of igniter characteristics in the operation of a solid propellant rocket motor is the temperature of the solid propellant. High temperatures tend to increase the burning rate of the solid propellant as well as the ignition thereof, for it is when the solid propellant rocket motor is subjected to high temperatures that optimum conditions exist. It is conversely true when low temperatures exist, and this condition affects the ignition characteristics of the igniter; for when the solid propellant requires the most ignition requirements, the rate of energy release from the igniter is at a minimum.

It is another object of the invention, therefore, to provide a temperature compensating igniter that balances the energy output of the igniter so that the ignition characteristics of the igniter remain constant regardless of the temperature relationship that exists between the igniter and the solid propellant in the rocket motor.

It is a still further object of this invention to provide a temperature compensating igniter that is adapted to react to "over-pressure" within the igniter to decrease the operating pressure and rate of energy release thereof when the solid propellant rocket motor is in the high temperature phase.

The temperature compensating igniter, therefore, accomplishes the matching of the solid propellant rocket motor and igniter characteristics by adjusting the exhaust areas of the igniter during the period when the solid propellant rocket motor is being subjected to the temperature range that affects the solid propellant rocket motor during its operation.

With the above and other objects and advantages in view, the invention consists of the novel details of construction, arrangement and combination of parts more fully hereinafter described, claimed and illustrated in the accompanying drawings in which:

FIGURE 1 is a partial longitudinal sectional view of one form of the temperature compensating igniter embodying the invention showing the assembly of the component parts thereof when the igniter is to operate under a low temperature range.

FIGURE 2 is a view, similar to FIGURE 1, showing the assembly of the component parts thereof when the igniter is to operate under a high temperature range.

FIGURE 3 is a vertical sectional view of the igniter on the line 3—3 of FIGURE 2.

FIGURE 4 is a view, similar to FIGURE 1, and showing another form of the invention.

FIGURE 5 is a view, similar to FIGURE 2, of the form shown in FIGURE 4.

FIGURE 6 is a vertical sectional view of the igniter on the line 6—6 of FIGURE 5, and FIGURE 7 is a partial elevational and sectional view of a solid propellant rocket motor showing the mounting of either form of the invention therein.

Referring more in detail to the drawings and, more particularly, to FIGURES 1 to 3 inclusive wherein one form of the invention is shown and wherein like parts are designated by like reference numerals, the reference numeral 10 is used to generally designate a temperature compensating igniter embodying this form of the invention.

In this form of the invention, the ignition characteristics of the igniter 10 are controlled by means of an internal diffuser 11 that is slidably mounted on a throat portion 12 of the igniter 10.

The igniter 10 comprises a tubular body 13 in which is cast a pyrotechnic material 14 which is the igniting medium for the solid propellant cast in a solid propellant rocket motor, as partially shown in FIGURE 7.

The tubular body 13 is provided with an integral tapered aft end 15 which is integral with the throat portion 12. The throat portion 12 differs from a conventional throat portion in that it is provided with a plurality of equally-spaced, radially-disposed ports 16 which, under certain operational conditions, will be aligned, as shown in FIGURE 2, with a similar number of equally-spaced, radially-disposed ports 17 in the diffuser 11, as will be later described.

The diffuser 11, in addition to having the ports 17, is also provided with a plurality of equally-spaced, longitudinally-disposed slots 18 which are positioned alternately in the diffuser 11 intermediate of the ports 17. The diffuser may also be provided with one or more sockets 19 which are in line with the longitudinal axis of the slots 18. A fixed orifice 20 is provided in the outer end of the diffuser 11, and it is through the orifice 20 that the igniter 10 exhausts.

A plurality of set screws 21 are threadably mounted in the throat portion 12 in alignment with the slots 18, and the set screws 21 limit the sliding movement of the diffuser 11, as shown in FIGURES 1 and 2. One or more shear pins 22 are also mounted in apertures 23 in the throat portion 12, and the shear pins 22 extend into the sockets 19 in the diffuser 11 when the sockets 19 and apertures 23 are in alignment with each other, as shown in FIGURE 1.

Referring more particularly to FIGURES 4 to 6 wherein another form of the invention is shown, the ignition characteristics of the igniter 24 are controlled by means of an external diffuser 25 that is slidably mounted on a throat portion 26 of the igniter 24.

The igniter 24 comprises a tubular body 27 in which is cast a pyrotechnic material 28 which is the igniting medium for the solid propellant rocket motor, as partially shown in FIGURE 7.

The tubular body 27 is provided with an integral tapered aft end 29 which is integral with and has communication with the throat portion 26. The throat portion 26 also differs from a conventional throat portion in that it is provided with a plurality of equally-spaced, radially-disposed ports 30 which, under certain operational conditions, will be aligned, as shown in FIGURE 6, with a similar number of equally-spaced, radially-disposed ports 31 in the diffuser 25, as will be later described.

The diffuser 25, in addition to having the ports 31, is also provided with a plurality of equally-spaced, longitudinally-disposed slots 32 which are positioned alternately in the diffuser 25 intermediate of the ports 31. The diffuser 25 may also be provided with one or more apertures 33 which are in line with the longitudinal axis of the slots 32. A fixed orifice 34 is provided in the outer end of the diffuser 25, and it is through the orifice 34 that the igniter 24 exhausts.

A plurality of set screws 35 are threadably mounted in the throat portion 26 in alignment with the slots 32, and the set screws 35 limit the sliding movement of the diffuser 25, as shown in FIGURES 4 and 5. One or more shear pins 36 are also mounted in apertures 33 in the diffuser 25, and the shear pins 36 extend into sockets 37 in the throat portion 26 when the apertures 33 and sockets 37 are in alignment with each other, as shown in FIGURE 4.

In the operation of either form of the igniter embodying the invention, the igniter is to be used with a conventional solid propellant rocket motor 38 which includes a motor case 39 having a head end 40 that is provided with a centrally-disposed opening 41. Either form of the igniter is inserted into the opening 41 and extends into a central configuration 42 in the solid propellant 43 that has been cast into the motor case 39. In the usual manner, either form of the igniter is provided with one or more electrically-actuated initiators 44 from which electric wires 45 extend to a remotely-located electrical control, not shown, FIGURE 7.

When either form of the igniter is installed in the motor case 39, the component parts thereof are as shown in FIGURES 1 and 4. Each of the diffusers are shown in retracted positions, and the igniters are set to operate under low temperature conditions or ranges. The diffusers will be retained in these positions by reason of the shear pins, and these shear pins will restrain the diffusers under low temperature conditions or ranges.

Basically, for an igniter which has a fixed surface area of pyrotechnic material, the energy release rate is directly proportional to the burning rate. The burning rate of the igniter will, therefore, increase with an increase in temperature (initial temperature) as well as with an increase in pressure or vice versa. Consequently, as the temperature of the pyrotechnic material increases in either form of the igniter, the burning rate also increases and the chamber pressure within the body of each igniter will increase. The increased pressure will tend to force the diffusers outwardly and such force will break the shear pins and permit the diffusers to move to the positions shown in FIGURES 2 and 5. Such action will increase the venting areas of the nozzles, thus reducing the exhaust pressure, reducing the burning rate, and reducing the energy release rate of the igniter.

Since the operation of either form of the invention is similar in all respects, the only differences are structural differences which occur when the diffuser is either mounted internally in the throat portion of the igniter or externally on the throat portion of the igniter.

It is believed, therefore, that from the foregoing description the manner of operation and construction of both forms of the invention will be clear to those skilled in the art, and it is to be understood that variations in either the manner of operation or construction of the igniters may be adhered to providing such variations fall within the spirit of the invention and the scope of the appended claims.

Having thus described the invention, what is claimed as new and desired to be secured by Letters Patent is:

1. A temperature compensating igniter comprising a body portion, a throat portion integral with said body portion having a plurality of radially-disposed ports therein, an ignitable pyrotechnic material in said body portion, means for igniting said material mounted in said body portion, a diffuser having radially-disposed ports therein and a fixed orifice in one end thereof mounted for sliding movement in relation to said throat portion, shear pins engaging said throat area and said diffuser for retaining said diffuser adjacent to one end of said throat portion, and means mounted in said throat portion and said diffuser for limiting the sliding movement of said diffuser to a predetermined registry of said diffuser ports with said body ports when said shear pins are destroyed by the increase of pressure in said body during the burning of said pyrotechnic material.

2. A temperature compensating igniter, as in claim 1, wherein said igniter diffuser is mounted on said throat portion internally thereof.

3. A temperature compensating igniter, as in claim 2, wherein the means for limiting the sliding movement of said diffuser comprises a plurality of set screws mounted in said throat portion and a plurality of slots mounted in said diffuser and coacting with said set screws.

4. A temperature compensating igniter, as in claim 1, wherein said diffuser is mounted on said throat portion externally thereof.

5. A temperature compensating igniter, as in claim 4, wherein the means for limiting the sliding movement of said diffuser comprises a plurality of slots mounted in said diffuser and a plurality of set screws mounted in said throat portion and coacting with the slots in said diffuser.

References Cited

UNITED STATES PATENTS

| | | | |
|---|---|---|---|
| 2,939,281 | 6/1960 | Conyers | 137—70 X |
| 3,016,015 | 1/1962 | Filstrup | 137—70 X |
| 3,125,025 | 3/1964 | Boggs | 60—39.82 X |

RALPH D. BLAKESLEE, *Primary Examiner.*

MARK NEWMAN, *Examiner.*